Figure 1:
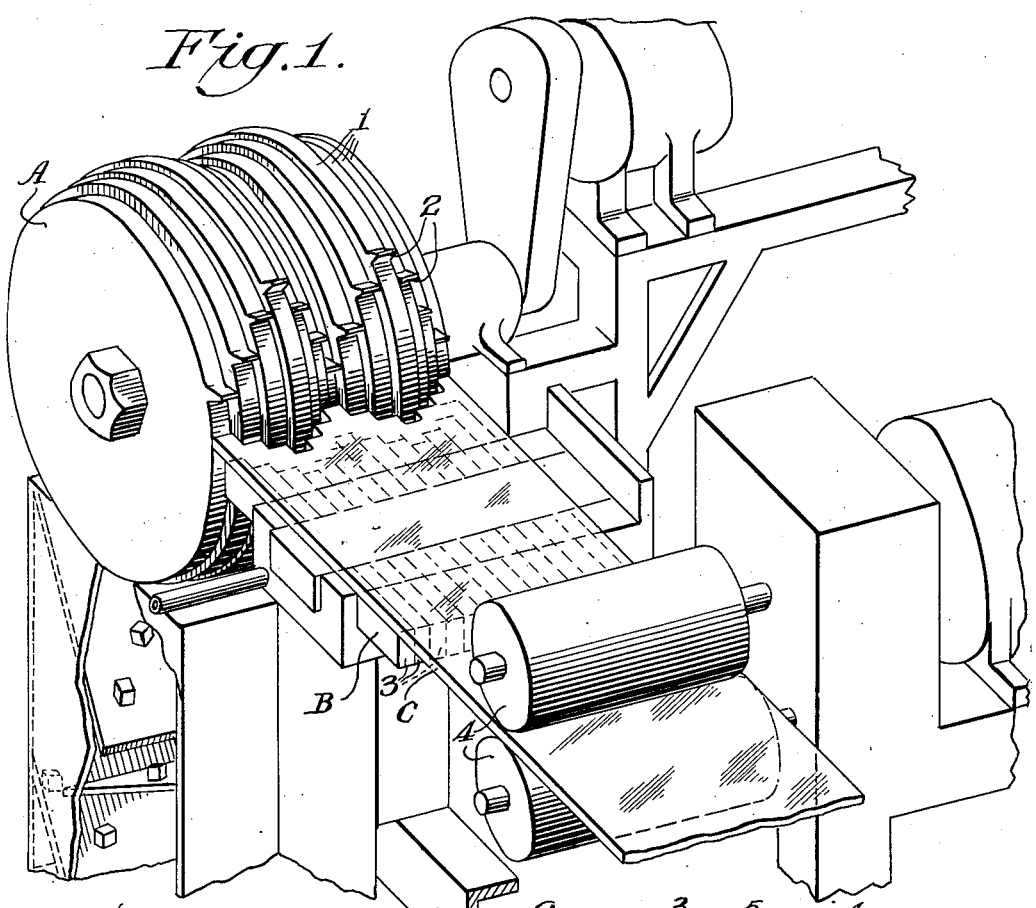

Oct. 13, 1953  F. E. ANDERSON  2,655,213
CUTTING MACHINE FOR PLASTIC SHEETING
Filed June 30, 1950  2 Sheets-Sheet 1

INVENTOR.
FREDERICK EDWIN ANDERSON
BY
Harry Cress, Jr.
AGENT

Oct. 13, 1953     F. E. ANDERSON     2,655,213
CUTTING MACHINE FOR PLASTIC SHEETING
Filed June 30, 1950     2 Sheets-Sheet 2
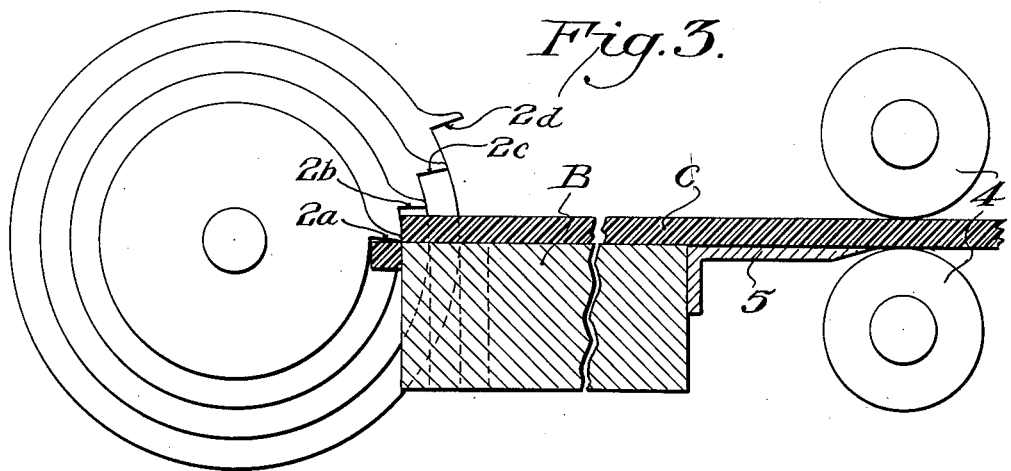
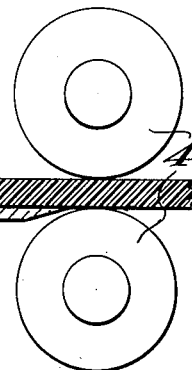
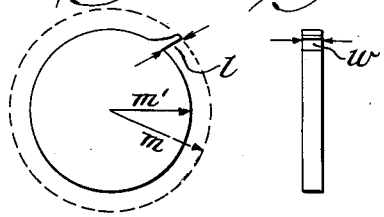
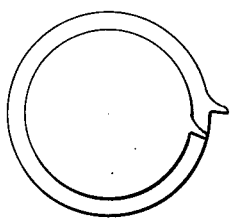
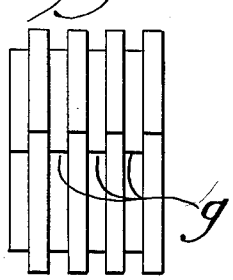
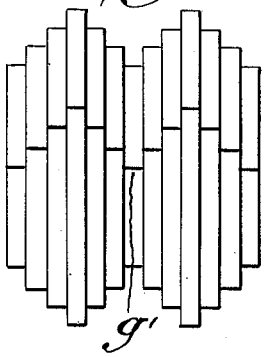
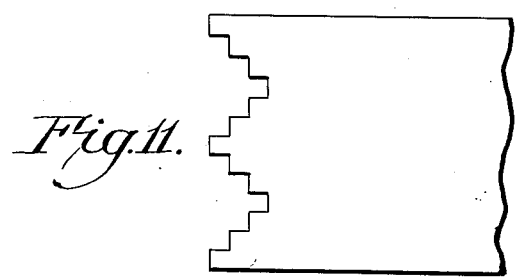
INVENTOR.
FREDERICK EDWIN ANDERSON
BY Harry Cress, Jr.
AGENT Patented Oct. 13, 1953

2,655,213

UNITED STATES PATENT OFFICE 2,655,213

CUTTING MACHINE FOR PLASTIC SHEETING

Frederick Edwin Anderson, Elizabeth, W. Va., assignor to E. I. du Pont de Nemours and Company, Wilmington, Del., a corporation of Delaware Application June 30, 1950, Serial No. 171,521

9 Claims. (Cl. 164—68)

This invention relates to a machine for cutting plastic materials and the like into uniform particles, and more particularly, into cubes.

In the commercial production of molding powders such as polymethyl methacrylate, polystyrene, ethylene polymers and synthetic polyamides, an important objective is to produce a molding powder formulation of uniform bulk density. This means that the individual polymer particles are of substantially uniform size and shape. Molding powders having a wide distribution of particle sizes and shapes, and consequently having a variation in bulk density, are highly objectionable in the molding industry. This is because the molding powder is metered to the molding press cylinder on a volume basis, and variation in bulk density means that injection charges of variable weights are metered to the molding press cylinder. For this reason, it is necessary to adjust the metering stroke to insure complete filling of the die cavity to suit material of the lowest bulk density in the batch. But, as the bulk density of the molding powder increases, this results in over-size charges producing a considerable amount of flash or fins on the molded article.

Obviously, some variation in the bulk density of a molding-powder may be tolerated. However, production of a molding powder having individual plastic particles of substantially uniform size and shape provides for an economic advantage over processes which require classification of plastic particles for molding powder into "fines," "longs," and acceptable sizes. Hence, plastic particles in the form of fines and longs which are separated from the acceptable product must be reworked or discarded.

In current commercial production of molding powder, the number of non-uniform particles formed, particularly in the cutting operation, is appreciable. In general, the amount of plastic which must be reworked subsequent to separation from the acceptable product may be as high as 10%. This does not include those substantially non-uniform particles which are not removed from the acceptable product, such particles tending to give variations in the bulk density of the final product.

Figure 2:
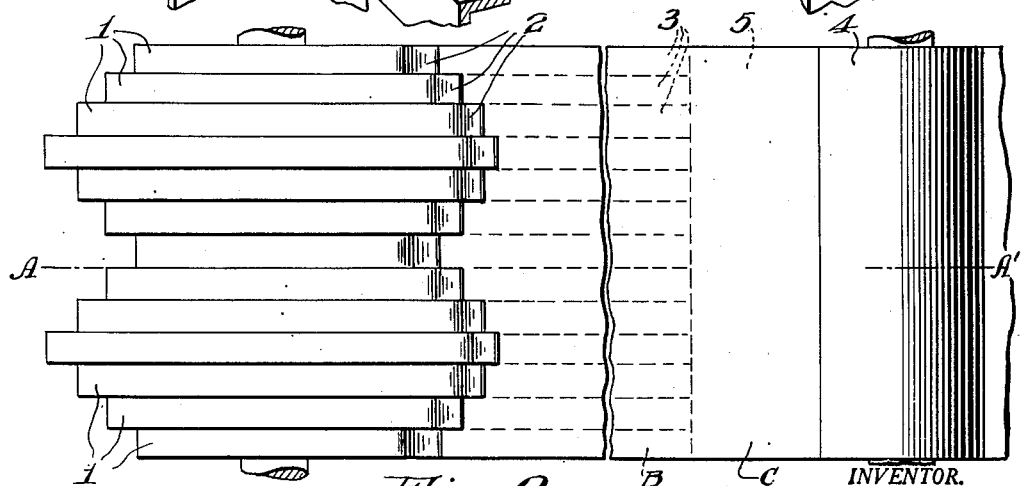

Referring to the drawings forming a part of this application:

Figure 1 is a schematic drawing of a cutting apparatus showing a type of rotary cutter included within the scope of the present invention, Figure 2 is a top view of the apparatus showing a plastic sheet as it is being fed into a rotary cutter of the type shown in Figure 1, the sheet C being fed through pinch rolls 4, across the intermediate support 5 and the bed plate B, and thereafter into the cutting faces 2 of the rotor A, Figure 3, which is section A—A' of Figure 2, clearly shows the radial and circumferential staggering of the cutting faces, Figure 4 is a side view of a disc having one cutting face, Figure 5 is a front view of the disc shown in Figure 4, Figure 6 is a side view of the minimum unit included within the scope of the present invention, Figure 7 is a front view of the minimum unit included within the scope of the present invention, Figure 8 is a composite of four of the units shown in Figures 6 and 7, Figure 9 is a front view of a unit having four discs and, for simplicity, one cutting face per disc, each cutting face being in different radial and circumferential positions, Figure 10 is a composite of four of the units shown in Figure 9, Figure 11 shows the staggered edge of a plastic sheet cut by a rotor of the type shown in Figure 10.

In Figure 1, A is a rotor composed of a multiplicity of composited discs 1, and B is the bed plate composed of a multiplicity of composited platen bars 3. The plastic sheet C is fed between pinch rolls 4, over the bed plate B, and into the cutting faces 2 of the rotor A.

In Figure 4, the distance represented by $l$ is known as the length of a cutting face, the length of a cutting face extending from the minor circumference of the disc, as indicated by minor diameter $m'$, to the major circumference, as indicated by major diameter $m$. Since the cutting face is usually raked at an angle to the horizontal plane containing the sheet to be cut, the length of a cutting face does not represent merely the difference between the major and minor diameter of a disc.

Figure 5 illustrates what is meant by the width of a cutting face as shown by $w$.

An object of the present invention is to provide for the production of molding powders of uniform bulk density. A more specific object of this invention is to provide a cutter for continuously subdividing plastic sheets or ribbons into individual particles of uniform size and shape. In still more specific form, an object of the present invention is to provide a cutter for continuously subdividing plastic sheets or ribbons into uniform cubes or rectangular shapes.

The above objects are accomplished according to the present invention by means of a rotary cutter adapted for continuously cutting plastic sheets having a thickness no greater than about 0.2 inch, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

In more specific form, the cutter of the present invention comprises a rotor composed of a multiplicity of composited discs, each disc having at least one cutting face, and a bed plate composed of a multiplicity of composited platen bars, the cutting faces of a corresponding group of adjacent cutting faces being staggered stepwise in four different circumferential positions and four different radial positions, the cutting faces positioned nearest to the rotor axis being the leading cutting faces of a corresponding group of adjacent cutting faces with respect to the direction of rotation, the circumferential distance between cutting faces of a corresponding group of adjacent cutting faces being between 1.25 and 1.50 times the thickness of the sheeting, the groups of corresponding adjacent cutting faces being arranged symmetrically about the circumference of the rotor, and the total number of groups of corresponding adjacent cutting faces occupying between 35° and 75° of the periphery of the rotor.

A characteristic of the prior art cutters is that the sheet of plastic material is fed intermittently to the cutter. In contrast thereto, the cutter of the present invention can be operated continuously. Continuous operation is essential in cutting plastic sheets at the somewhat elevated temperatures required for producing a successful cut. Intermittent operation at such temperatures would result in buckling or bending the sheets.

The cutter of the present invention is particularly adaptable for cutting plastic sheeting having a thickness no greater than about 0.2 inch, for example, sheets of polymethyl methacrylate, polystyrene, ethylene polymers, synthetic polyamides, cellulose acetate, and various vinyl polymers. The present cutter provides a number of distinct improvements over the general design of the cutter disclosed by U. S. Patent No. 286,535. Primarily, it is essential that the distance between cutting faces in a corresponding group of adjacent cutting faces, as illustrated by 2a, 2b, 2c and 2d of Figure 3, be greater than the thickness of the sheeting being cut. Assuming, that it is obvious that when there is more than one corresponding group of adjacent cutting faces per cutter rotor, that is, more than one cutting face per disc, the corresponding groups of adjacent cutting faces will be arranged symmetrically about the circumference of the rotor, it has been found that the total number of groups of adjacent cutting faces should occupy no greater than 90° of the periphery of the rotor. The term periphery, as used herein, refers to the average circumference of the rotor, since a rotor is composed of discs of varying diameters. Experience has shown that if greater than 90° of the periphery is occupied by the total number of groups of corresponding adjacent cutting faces, the plastic sheet cannot be fed into the cutter rapidly enough to accommodate for the additional cutting faces and still feed at a uniformly continuous rate. It is to be understood that in cutting plastic sheets at the relatively elevated temperatures, in the neighborhood of 100° C. to 160° C., required for obtaining a clean cut without danger of buckling, emphasis is placed upon the necessity of a continuous uniform rate of feed.

As mentioned above, the cutter of the present invention is a vast improvement over similar types of cutters for subdividing plastic sheeting because the cutter of this invention is designed to provide for continuous movement of a plastic sheet or ribbon into the cutting faces. Continuous cutting of a plastic sheet into uniform particle sizes cannot be accomplished at the relatively elevated temperatures required for obtaining a clean cut without danger of buckling the sheet unless the sheet can be fed into the cutter in a continuous fashion. This is evidenced from the usual method of producing a continuous sheet or ribbon of plastic. Usually, the sheet is extruded or formed on a milling roll, and thereafter, continuously fed into a cutter. It is obvious that it would be highly impractical to run the milling rolls or an extruder intermittently in order to feed the cutter intermittently. Consequently, a satisfactory cutter must accept a continuous feed, and this is accomplished by the cutter of the present invention.

The most critical feature of the present cutter is the limitation on the circumferential distance between corresponding adjacent cutting faces. This distance must be greater than the thickness of the sheeting being cut. Theoretically, the circumferential distance between corresponding adjacent cutting faces may be just slightly greater than the thickness of the sheeting, but for practical design, it is preferred that the distance be at least 25% greater than the average thickness of the sheeting. Furthermore, as the circumferential distance between cutting faces in a corresponding group approaches the thickness of the sheeting, the sheeting cannot move in between cuts to as great an extent as when the circumferential distance between cutting faces increases. On the other hand as the circumferential distance between cutting faces in a corresponding group increases to a value appreciably greater than the thickness of the sheeting being cut, the operation ceases to be continuous because the sheet is butted against the minor circumference of the larger disc until the cutting faces of the larger disc make a cut. Experience with the cutter of the present invention has shown that the circumferential distance between adjacent cutting faces in a corresponding group must be no greater than 1.75 times the average thickness of the sheeting being cut in order to provide for continuous operation. For rotor discs between about 6 inches to 12 inches in diameter, the circumferential distance between cutting faces in a corresponding group should be no greater than about 4°. Preferably, the circumferential distance between cutting faces in a corresponding group should be between 1.25 and 1.50 times the average thickness of the sheeting.

For a given rate of rotation of a cutter rotor, it is readily apparent that as the number of cutting faces on a disc is increased, the sheet must be fed more rapidly into the cutter. Since the circumferential distance between cutting faces in a corresponding group of adjacent cutting faces must be greater than the thickness of the sheeting being cut, it follows that the portion of the average periphery to be occupied by groups of adjacent cutting faces is limited. Furthermore, depending upon the rate of extrusion or formation of the plastic sheet, the optimum rate of feed of the sheet into the cutter will vary, the rate of extrusion or formation of the sheet depending mainly upon the plastic material. In cutting such materials as polymethyl methacrylate, various synthetic linear polyamides and polymers of ethylene, it has been found that the portion of the average periphery of the cutter rotor occupied by the corresponding groups of adjacent cutting faces should be no greater than $\frac{1}{4}$ or 90°. If the groups of corresponding adjacent cutting faces occupy greater than 90° of the periphery, a sheet cannot be fed into the cutter rapidly enough to form uniform particles and still maintain a uniform rate. Usually the portion of the average periphery occupied by the corresponding groups of adjacent cutting faces will be between 35° and 75°.

Figure 6 shows a side view and Figure 7 shows a front view of the minimum unit within the scope of the present invention, that is, two discs, each having one cutting face. The cutting faces are staggered stepwise in two different radial positions and two different circumferential positions. Obviously, such a minimum unit would be impractical for obtaining commercial production rates. Multiples of this minimum unit, as shown in Figure 8, may be used, but such a cutter rotor has the disadvantage that the plastic particles cut by the cutting faces of the smaller discs tend to wedge under the cutting faces, indicated by $g$, and be sandwiched between the side walls of the adjacent larger discs. Hence, fifty per cent of the material being cut tends to wedge beneath the cutting faces of the smaller discs because these cutting faces are sandwiched between larger adjacent discs. This tendency of the particles to wedge can be overcome by machining the side walls of the adjacent discs beneath the cutting faces of the smaller discs. The amount the side walls are machined is termed "side relief."

The main disadvantage of a cuttsr rotor made by compositing a multiplicity of minimum units shown in Figures 6 and 7 is overcome by using the type of unit shown in Figure 9. For simplicity, each disc is shown with only one cutting face, but in a commercial unit each disc would have more than one cutting face. In such a unit shown in Figure 9 the cutting faces in a corresponding group are staggered stepwise in four different circumferential positions and four different radial positions each in the same direction. It is readily apparent that when four of the basic units shown in Figure 9 are composited to form a cutter rotor, as shown in Figure 10, only cutting face $g'$ is sandwiched between larger adjacent discs. Hence, by increasing the number of radial and circumferential positions in which cutting faces in the corresponding groups of a unit are to be staggered, the number of cutting faces which must be provided with side relief is considerably reduced when these units are composited to form a rotor of the desired width. It should be mentioned that the number of units or actually the number of discs which make up a cutter rotor depends upon the width of the disc or cutting face to be used and the width of the ribbon or sheet of plastic to be cut. Usually, the width of a disc is the same as the width of its cutting face. If $\frac{1}{8}$ inch cubes are to be cut from a ribbon $\frac{1}{8}$ inch in thickness, the width of the disc or cutting face will be $\frac{1}{8}$ inch. The width of a ribbon to be cut may be such that a unit as shown in Figure 9 may be used or it may be of such width that a composite of these units is required as illustrated by Figure 10.

There is no particular upper limit on the number of radial and circumferential positions in which cutting faces in a corresponding group of adjacent cuttings faces may be staggered. However, the practicability of fabricating a large number of rotor discs of different sizes should be considered. It is preferred to have from 3 to 6 discs in a unit, that is to have the cutting faces in a corresponding group staggered stepwise in from 3 to 6 different circumferential and radial positions.

The bed plate used in conjunction with the cutter rotor is composed of a multiplicity of composited platen bars which are staggered stepwise and aligned with the composited discs of the rotor so that a close clearance, between about 0.001 inch and 0.006 inch, exists between a disc and an aligned platen bar. The bed plate is so designed that it absorbs the shock of the cuts, thereby substantially eliminating the danger of cracking or splitting the plastic sheet or ribbon. In providing a bed plate for a rotor composed of a multiplicity of discs having cutting faces staggered in a relatively large number of radial positions, the platen bars aligned with the rotor discs of smaller diameters project out in cantilever fashion, and such sections of the bed plate which project out to any extreme may not provide adequate support for absorbing the cutting action at the end of the cantilever. Such considerations must be taken into account when designing a cutter rotor so that the number of different radial positions in which the cutting faces are staggered will not be excessive. Since in most cases, the number of different radial positions in which the cutting faces in a corresponding group are staggered will be equal to the number of different circumferential positions, the design of the bed plate to effectively absorb shock, as mentioned above, will also affect the number of circumferential positions in which the cutting faces are to be staggered.

It can be readily seen from Figure 3 that circumferential staggering of the cutting faces provides for cutting the plastic sheet in steps so that adjacent cuts are not made simultaneously. Such stepwise cutting action eliminates the possibility of two or more particles being connected by a thin strand of plastic in instances where slight lateral movement of the sheet causes a cutting face to cut part of the sheet which would have been cut by an adjacent cutting face.

Furthermore, with respect to circumferential staggering, the cutting face which makes the first cut in a corresponding group of adjacent cutting faces must be closest to the axis of the cutter rotor in order that the sheet may move into the cutting faces in a uniformly continuous fashion. Hence, the leading cutting face in a corresponding group is the one closest to the rotor axis.

Depending upon the particle size desired, the toughness of the plastic material being cut, and various factors affecting maintenance of the cutter, mechanical modifications may be made to alter the design of the cutting faces to provide for smoother cutting action and easier maintenance. For example various factors which affect the cutting action and maintenance of a cutting face are rake, overlap and length.

The rake of a cutting face, which is the angle between a cutting face and the horizontal plane containing the sheet to be cut, may vary from 10° to 40°. The greater the rake the sharper the cutting action.

A cutting face may project beyond the minor circumference of the adjacent larger disc. This is known as overlap, and it provides for repeated sharpening of the cutting faces.

When a rectangular particle is desired, the length of a cutting face is usually greater than the width. This permits the sheet to move further into the cutter rotor, and longer particles are produced.

Obviously, various other modifications may be incorporated in the design of cutters within the scope of this invention. Operating conditions will also vary with the material being cut. Depending upon the toughness or brittleness of the plastic material to be cut, the operating temperature of the material will vary. For example, polymethyl methacrylate is cut at a temperature between 125° C. and 150° C. On the other hand ethylene polymers are cut at a temperature between 30° C. and 50° C. Obviously, to prevent cracking or splitting, brittle materials must be cut at higher temperatures than tougher materials.

As many apparently widely different embodiments of this invention may be made without departing from the scope and spirit thereof, it is to be understood that the invention is not limited to the specific embodiments thereof except as defined in the appended claims.

I claim:

1. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

2. A rotary cutter adapted for continuously cutting plastic sheets having a thickness no greater than about 0.2 inch, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in four different circumferential positions in the same direction, each cutting face being staggered radially with respect to the corresponding cutting face of an adjacent disc, the cutting faces of a corresponding group of adjacent cutting faces being staggered stepwise in four different radial positions in the same direction, the cutting faces positioned nearest to the rotor axis being the leading cutting faces of a corresponding group of adjacent cutting faces with respect to the direction of rotation, the circumferential distance between cutting faces of a corresponding group of adjacent cutting faces being between 1.25 and 1.50 times the thickness of the sheeting, the groups of corresponding adjacent cutting faces being arranged symmetrically about the periphery of the rotor, the total number of groups of corresponding adjacent cutting faces occupying between 35° and 72° of the periphery of the rotor.

3. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the arrangement of the cutter being such that it comprises no more than one disc of relatively small diameter surrounded on each side by a disc of larger diameter, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

4. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the arrangement of the discs on the cutter being such that there is no instance in which a disc of relatively small diameter has a disc of relatively larger diameter on each side of it, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery.

5. A rotary cutter adapted for continuously cutting plastic sheets, which cutter comprises a rotor composed of a multiplicity of composited discs mounted to revolve about a common axis, each disc having at least one cutting face, and a bed plate notched to correspond with the outline of the discs on the rotor and positioned perpendicular to the common axis of said discs so that a close clearance exists between the bed plate and the cutting faces of each of the discs, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

6. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the angle between each cutting face and the horizontal plane containing the sheet to be cut being from 10° to 40°, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

7. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, each of the cutting faces on the relatively smaller discs overlapping slightly over the minor circumference of the adjacent larger disc, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

8. A rotary cutter adapted for continuously cutting plastic sheets, which cutter comprises a rotor composed of a multiplicity of composited discs mounted to revolve about a common axis, and means synchronized with the rotation of the rotor for continuously feeding sheeting into the rotor, each disc of the rotor having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

9. A rotary cutter adapted for continuously cutting plastic sheets, which cutter comprises a rotor composed of a multiplicity of composited discs mounted to revolve about a common axis, each disc having at least one cutting face, and a bed plate composed of a multiplicity of composited platen bars, each positioned perpendicular to the common axis of said discs so that a close clearance exists between a platen bar and a cutting face of an aligned disc, each cutting face being staggered circumferentially with respect to the corresponding cutting face of an adjacent disc, the cutting faces of a corresponding group of adjacent cutting faces being staggered stepwise in at least two different circumferential positions, each cutting face being staggered radially with respect to the corresponding cutting face of an adjacent disc, the cutting faces of a corresponding group of adjacent cutting faces being staggered stepwise in at least two different radial positions, the side walls of the discs adjacent to any smaller disc which is surrounded by two larger discs being machined away beneath the cutting face of the smaller disc to provide "side relief," the circumferential distance between cutting faces of a corresponding group of adjacent cutting faces being greater than the thickness of the sheeting but no greater than 1.75 times the thickness, the groups of corresponding adjacent cutting faces being arranged symmetrically about the periphery of the rotor, the total number of groups of corresponding adjacent cutting faces occupying no more than 90° of the periphery of the rotor.

FREDERICK EDWIN ANDERSON.

References Cited in the file of this patent

UNITED STATES PATENTS

| Number | Name | Date |
|---|---|---|
| 286,535 | Everding | Oct. 9, 1883 |
| 1,129,980 | Hdynau | Mar. 2, 1915 |
| 1,938,394 | Lyon | Dec. 5, 1933 |
| 2,335,515 | Jehle | Nov. 30, 1943 |